US012658503B2

(12) United States Patent
Kellner et al.

(10) Patent No.: US 12,658,503 B2
(45) Date of Patent: Jun. 16, 2026

(54) BATTERY MODULE WITH CELL DEGASSING OPENINGS

(71) Applicant: Dr. Ing. h.c. F. Porsche Aktiengesellschaft, Stuttgart (DE)

(72) Inventors: Philipp Kellner, Renningen (DE); Christopher Volkmer, Niefern-Öschelbronn (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 712 days.

(21) Appl. No.: 18/073,625

(22) Filed: Dec. 2, 2022

(65) Prior Publication Data

US 2023/0178823 A1     Jun. 8, 2023

(30) Foreign Application Priority Data

Dec. 3, 2021     (DE) ..................... 10 2021 131 908.0

(51) Int. Cl.
*H01M 10/6568*          (2014.01)
*H01M 10/613*          (2014.01)
        (Continued)

(52) U.S. Cl.
CPC ..... *H01M 10/6568* (2015.04); *H01M 10/613* (2015.04); *H01M 10/625* (2015.04);
        (Continued)

(58) Field of Classification Search
None
See application file for complete search history.

(56) References Cited

U.S. PATENT DOCUMENTS 9,837,647 B2     12/2017   Schmidt et al.
2012/0177952 A1*   7/2012   Maguire ............. H01M 10/647
                                                                429/1

(Continued)

FOREIGN PATENT DOCUMENTS

CN          104137294 A  * 11/2014  .......... H01M 10/647
DE     102013014929 A1      3/2015
        (Continued)

OTHER PUBLICATIONS

JP_6057961_B2_Machine_Translation_.pdf (Year: 2025).*
JP_6057961_B2_Machine_Translation (Year: 2025).*
CN_104137294_A Machine_Translation (Year: 2025).*

*Primary Examiner* — Nicole M. Buie-Hatcher
*Assistant Examiner* — Kenneth Max Otero
(74) *Attorney, Agent, or Firm* — Buchanan Ingersoll & Rooney PC

(57)          ABSTRACT
A battery module includes a plurality of battery cells, a cuboidal module housing, and, on a degassing side of the module housing, at least one module degassing opening. The battery module is connected to a temperature control system and the plurality of battery cells is directly surrounded by the flow of a temperature control fluid. A respective battery cell includes a cell degassing opening, wherein all cell degassing openings are arranged so as to point to the degassing side. The at least one module degassing opening and the respective cell degassing openings are directly connected to at least one degassing region. The at least one degassing region is delimited from the temperature control fluid. The at least one degassing region is smaller in its surface area extension than the degassing side, such that the temperature control fluid passes between the degassing side and the battery cells.

18 Claims, 5 Drawing Sheets

(51) Int. Cl.
  *H01M 10/625*   (2014.01)
  *H01M 10/6566*  (2014.01)
  *H01M 50/30*   (2021.01)

(52) U.S. Cl.
  CPC ....... *H01M 10/6566* (2015.04); *H01M 50/30*
     (2021.01); *H01M 2220/20* (2013.01)

(56)     References Cited

U.S. PATENT DOCUMENTS

| | | | |
|---|---|---|---|
| 2012/0247338 A1* | 10/2012 | Bauer .................... | B01D 63/14 |
| | | | 29/446 |
| 2013/0059175 A1* | 3/2013 | Engel ................ | H01M 10/0413 |
| | | | 429/82 |
| 2015/0303527 A1 | 10/2015 | Maxwell | |
| 2022/0166103 A1* | 5/2022 | Mee .................. | H01M 10/0525 |

FOREIGN PATENT DOCUMENTS

| | | | |
|---|---|---|---|
| DE | 102014201165 A1 | 8/2015 | |
| DE | 102018215477 A1 | 3/2020 | |
| EP | 4002572 A1 | 5/2022 | |
| JP | 2016062757 A | 4/2016 | |
| JP | 6057961 B2 * | 1/2017 | |

* cited by examiner

BATTERY MODULE WITH CELL DEGASSING OPENINGS

CROSS-REFERENCE TO RELATED APPLICATION

This application claims priority to German Patent Application No. 10 2021 131 908.0, filed Dec. 3, 2021, the content of such application being incorporated by reference herein in its entirety.

FIELD OF THE INVENTION

The present invention relates to a battery module having a plurality of battery cells that is perfused with temperature control fluid and in which degassing of battery cells is independent of the temperature control fluid. Further, a battery system having these battery modules is claimed.

BACKGROUND OF THE INVENTION

Battery cells in electrically or partially electrically operated motor vehicles are actively cooled in the prior art, because, in particular at higher outputs, they can heat up so much that they are damaged. A common method is to expose the battery cells to a direct flow with a dielectric fluid.

DE 10 2018 215 477 A1, which is incorporated by reference herein, relates to a battery system having a battery module connected to a coolant circuit in such a way that coolant is passed through. At least one battery cell is capable of being surrounded by the flow of the coolant, at least with a partial region of its surface.

In a case where one or more battery cells degas through, for example, a thermal event, which the person skilled in the art calls in English "thermal runaway," the gases generated must be discharged from the battery system in a controlled manner. Such gases can reach high temperatures and must be discharged from the system in such a way that sensitive components, such as adjacent, intact cells, as much as possible suffer no damage and that vehicle occupants are not endangered.

DE 10 2014 201 165 A1, which is incorporated by reference herein, discusses a battery module having a number of battery cells with upwardly lying degassing openings and are temperature-controlled by a temperature control fluid. Between the battery cells, a channel system flows through the temperature control fluid, while the battery cells can degas into an outgoing gas system separate from the channel system.

Gases are discharged from the battery system sealed for perfusion with temperature control fluid by means of bursting elements according to the prior art. Bursting elements are membrane-closed openings, wherein the membrane yields at a defined pressure and releases the opening. According to the prior art, a plurality of battery modules are arranged in a battery housing, to which at least one bursting element is attached and is used in order to reduce pressure during sudden degassing of a battery cell. Typically, the battery modules are not individually sealed in the battery box.

A battery with an associated housing is disclosed in DE 10 2013 014 929 A1, which is incorporated by reference herein, wherein a plurality of battery modules having a plurality of battery cells each are arranged within the housing. On the housing, there is a degassing opening with a check valve, which opens in the event of overpressure in the housing and otherwise hermetically seals it.

Hot gas escaping from a battery cell can pass by other battery cells and may heat them. In addition, short circuits and arcs may occur, because the hot gas is electrically conductive, and, at the temperatures encountered, they may fuse away insulation from electrical connections of the battery cells, particularly from high-voltage busbars.

A degassing projecting downwardly from the housing is indicated in order to protect vehicle occupants. During a degassing operation with directly cooled battery cells, however, —being advantageously directly surrounded by the flow of a temperature control fluid, i.e. not embedded in a unique conduit system—this leads to simultaneous drainage of temperature control fluid from the housing.

SUMMARY OF THE INVENTION

In light of the foregoing, it would be desirable to provide a cooled battery module in which safe degassing takes place for battery cells that are directly surrounded by the flow of a temperature control fluid. The total quantity of the temperature control fluid should be able to carry out the cooling of the battery module for as long as possible, especially during a thermal event of a battery cell. In addition, a battery system having such a battery module is to be provided.

To solve the aforementioned task, a battery module is proposed, wherein the battery module comprises a plurality of battery cells, a cuboidal module housing, and at least one module degassing opening on a degassing side of the module housing. The battery module is connected to a temperature control system, and the battery cells are directly surrounded by the flow of a temperature control fluid. A respective battery cell comprises a cell degassing opening. All cell degassing openings are arranged so as to be aligned towards the degassing side. The at least one module degassing opening and the respective cell degassing openings are directly connected to at least one degassing region, wherein the at least one degassing region is delimited from the temperature control fluid. The at least one degassing region is smaller in its surface area extension than the degassing side of the module housing, so that the temperature fluid passes between the degassing side and the battery cells.

The connection of the at least [one] degassing region and the respective degassing openings of the module housing and battery cells is referred to as "direct," because it is formed without a conduit system.

The battery cells of the battery module according to aspects of the invention are preferably formed with prismatic battery cells. These have a greater length and width compared to their cell thickness, wherein, in particular, the two side faces of the respective battery cell that are strained in length and width are surrounded by the flow of the temperature control fluid, while power connectors and cell degassing openings are generally on an edge characterized by the cell thickness.

The temperature control fluid is advantageously a dielectric liquid, for example a dielectric oil. Directly surrounding the battery cells with the flow of the temperature control fluid means that the temperature control fluid flows directly along respective battery cells. The temperature control fluid thus does not perfuse its own conduit system, which would additionally have to be arranged in the battery module. Rather, in the battery module according to aspects of the invention, flow channels are formed within the module housing, which are delimited on at least one side by a respective battery cell. In the case of direct surrounding of the battery cells, the temperature control fluid surrounding the battery cells in the event of a thermal event, for example an overheating of a lithium cell, leads to a reduction of a propagation of the overheating to adjacent battery cells.

In one embodiment of the battery module according to aspects of the invention, the at least one degassing region is delimited from the temperature control fluid by at least one seal. It is conceivable that the at least one seal experiences a leakage over a lifetime of the battery module, as a result of which the respective degassing region may fill with temperature control fluid, but is not perfused. Therefore, in a thermal event, the degassing region would indeed open outwards, and thus the amount of temperature control fluid accumulated in the degassing region also reaches the environment, but, due to the continued sealing, a subsequent flow of the temperature control fluid would only occur very slowly, despite the leakage, and thus a hardly reduced temperature performance for the battery module would continue to be available.

In a further embodiment of the battery module according to aspects of the invention, the degassing region is formed by a seal extending around a plurality of cell degassing openings that are respectively closed with a closing part or a bursting element and, on the degassing side, around at least one module degassing opening. It is conceivable that the closing part within the battery cell will allow gases produced to escape from the battery cell but will not allow gases to enter the battery cell. The bursting element emits gases only from a predetermined internal pressure.

In a further embodiment of the battery module according to aspects of the invention, a number of respective module degassing openings is equal to a number of cell degassing openings of the plurality of battery cells arranged in the battery module and is thus also equal to a number of degassing regions. The respective module degassing opening and the respective cell degassing openings are arranged so as to be flush opposite one another.

In a further embodiment of the battery module according to aspects of the invention, a respective cell degassing opening is positively connected to the respective module degassing opening and/or to a seal surrounding the respective cell degassing opening.

In a further embodiment of the battery module according to aspects of the invention, the degassing side with the at least one module degassing opening is an underside of the battery module. The battery module according to aspects of the invention thus advantageously ensures a degassing towards a vehicle underside, i.e. away from a passenger compartment and away from vehicle occupants.

In a further embodiment of the battery module according to aspects of the invention, the battery module is integrated into an underbody structure of a motor vehicle. The at least one module degassing opening thus advantageously vents directly to a subjacent ambient air of the motor vehicle.

In another further embodiment of the battery module according to aspects of the invention, the at least one module degassing opening is closed with a closing part or a burst element. In the case of a thermal event in at least one battery cell, the closing part or bursting element is configured so as to open from a predetermined internal pressure.

In yet another further embodiment of the battery module according to aspects of the invention, at least one busbar for interconnecting the plurality of battery cells in the module housing is arranged on a side of the battery cell that is adjacent to or opposite the side with the cell degassing opening.

Further, a battery system is claimed comprising at least one battery module and a temperature control system, wherein the temperature control system is configured so as to provide a perfusion of the at least one battery module with a dielectric temperature control fluid.

Further advantages and configurations of the invention will emerge from the description and the accompanying drawing.

It goes without saying that the aforementioned features and the features yet to be explained in the following can be used not only in the respectively specified combination, but also in other combinations or on their own, without leaving the scope of the present invention.

BRIEF DESCRIPTION OF THE DRAWINGS

The figures are described in a coherent and comprehensive manner, and the same reference numbers are assigned to identical components.

DETAILED DESCRIPTION OF THE INVENTION

Figure 1:
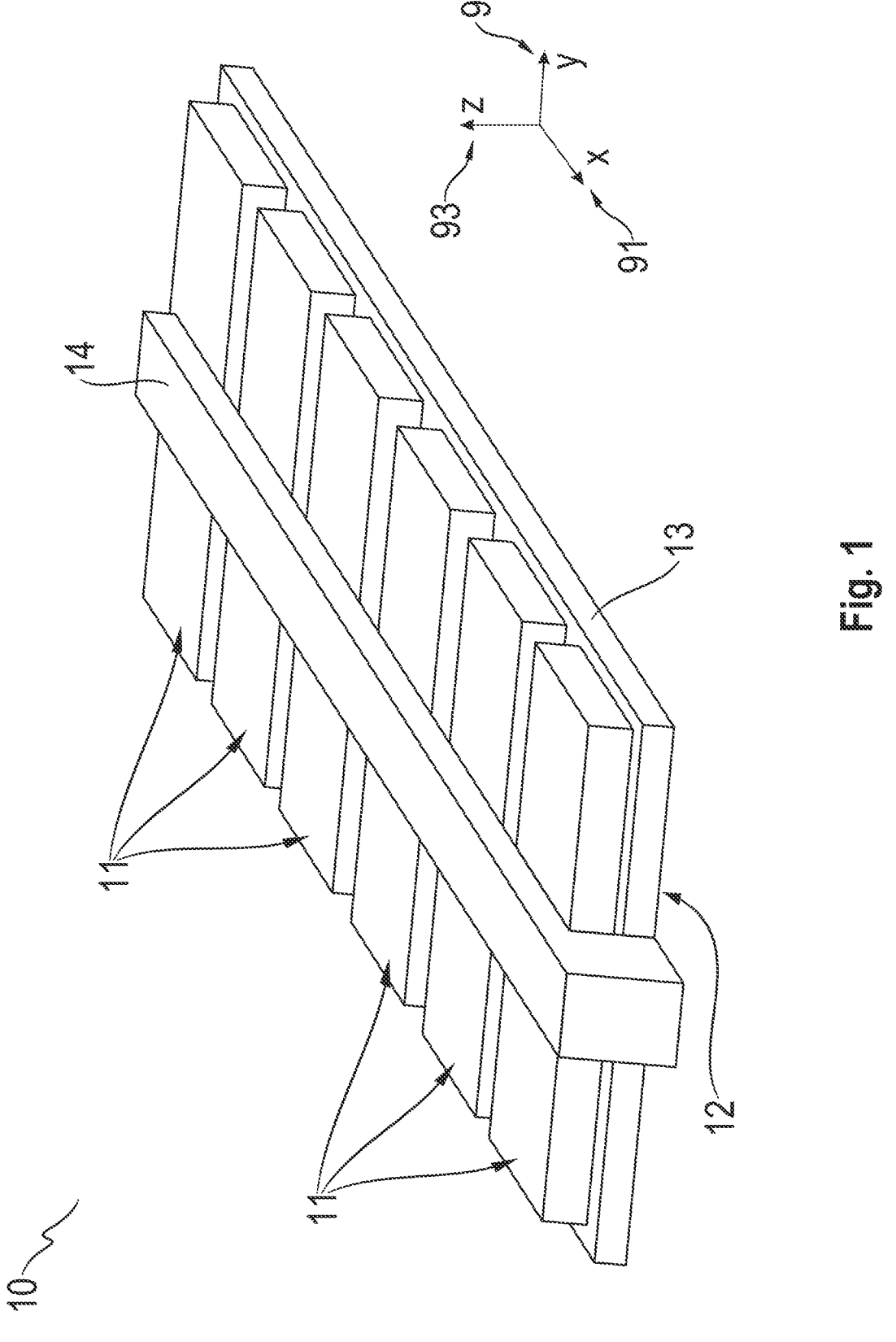
FIG. 1 schematically shows a perspective view of a configuration of the battery system according to aspects of the invention with battery modules.

In FIG. 1, a perspective view of a configuration of the battery system 10 according aspects of to the invention with battery modules 11 is shown schematically. The battery modules 11, which comprise battery cells stacked together in a y-direction 92, are arranged so as to be lined up in an x-direction 91 on a mounting frame 13, wherein the latter comprises free faces on an underside 12 (view from "below" in a z-direction 93). A path 14 leads busbars and conduits to a temperature control system, wherein the busbars and conducts are each connected to a respective battery module 11.

Figure 2:
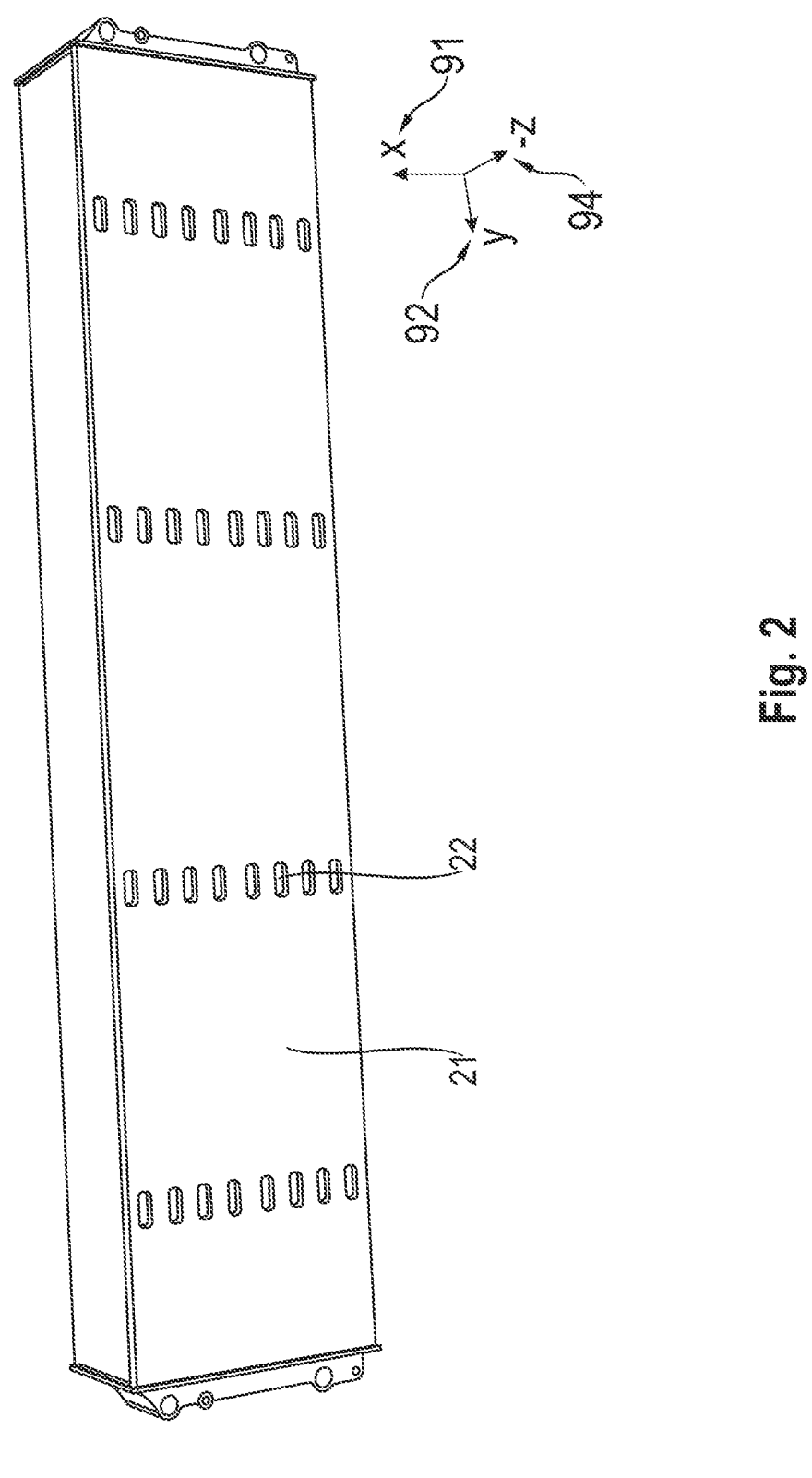
FIG. 2 schematically shows a perspective view of a configuration of a battery module according to aspects of the invention.

FIG. 2 schematically shows a perspective view of a configuration of a battery module 20 according to aspects of the invention. According to the present invention, a plurality of module degassing openings 22 are arranged on the underside, facing in the negative z-direction 94, of a module housing 21, which corresponds to a degassing side of the module housing 21.

Figure 3:
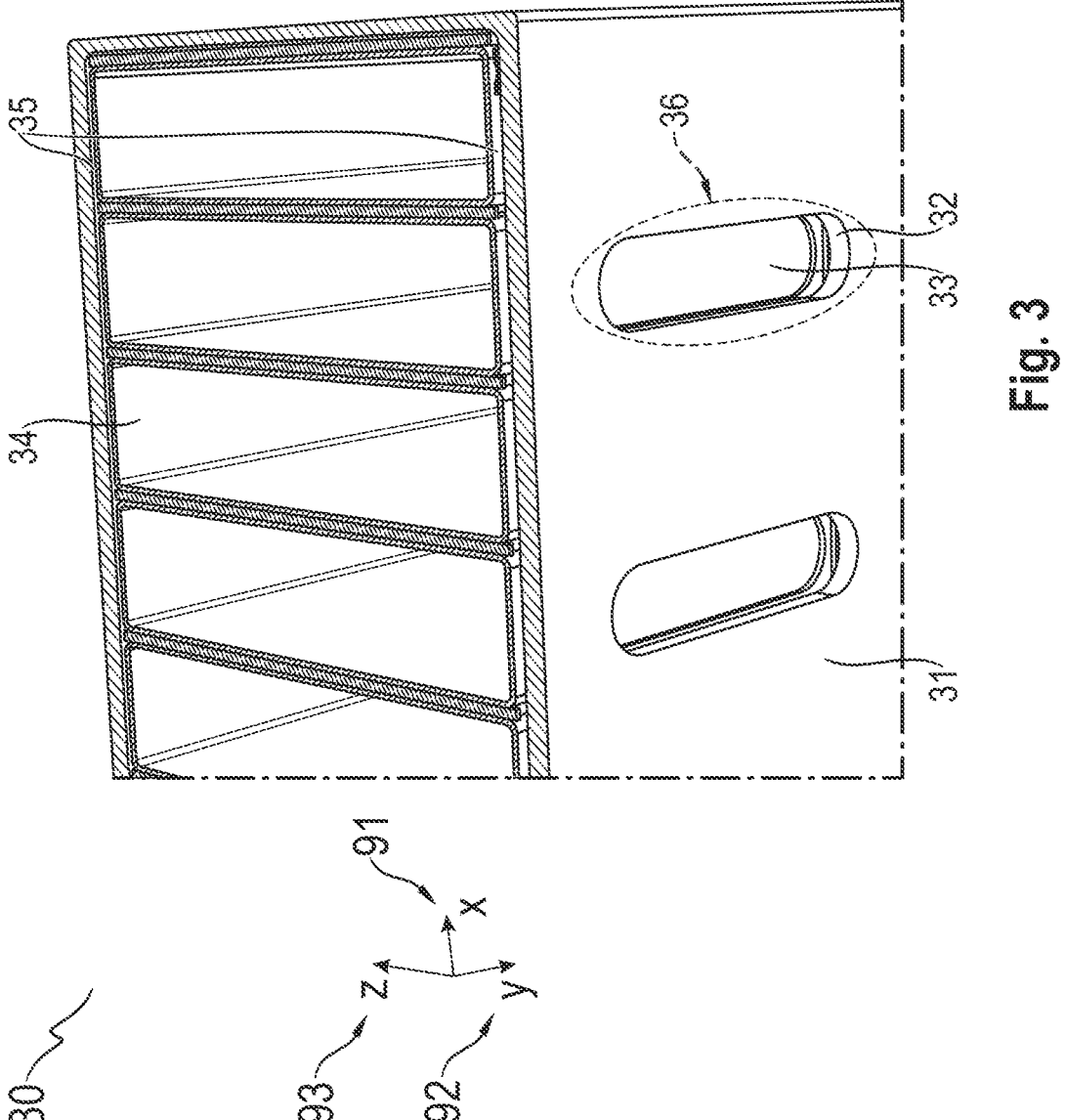
FIG. 3 schematically shows a perspective sectional view of a further configuration of a battery module according to aspects of the invention.

FIG. 3 schematically shows a perspective sectional view of a further configuration of battery module 30 according to aspects of the invention. Module degassing openings 32 are arranged on the degassing side 31 of the module housing. Within the module housing, there are a plurality of battery cells 34 stacked together. Between the battery cells 34 and the module housing, there is a respective clearance 35 (also described as a flow space for temperature control fluid), which is perfused with temperature control fluid. For example, only every other battery cell 34 is arranged exactly opposite the respective module degassing opening 32 with its cell degassing opening 33. According to the present invention, the cell degassing opening of each battery cell 34 adjacent thereto is consolidated so as to form a common degassing region 36 by means of a seal path.

Figure 4:
FIG. 4 schematically shows a perspective sectional view of a degassing region of yet another further configuration of the battery module according to aspects of the invention.

FIG. 4 schematically shows a perspective sectional view of a degassing region of yet another configuration of the battery module 40 according to aspects of the invention. The degassing region 46 is formed between a bursting element 42 located at the module degassing opening and, opposite thereto, a closing cap of a cell degassing opening 43, wherein said region is delimited from the temperature control fluid by a seal 44. The temperature control fluid perfuses the clearance 45 between the degassing side 41 of the module housing and the battery cells.

Figure 5:
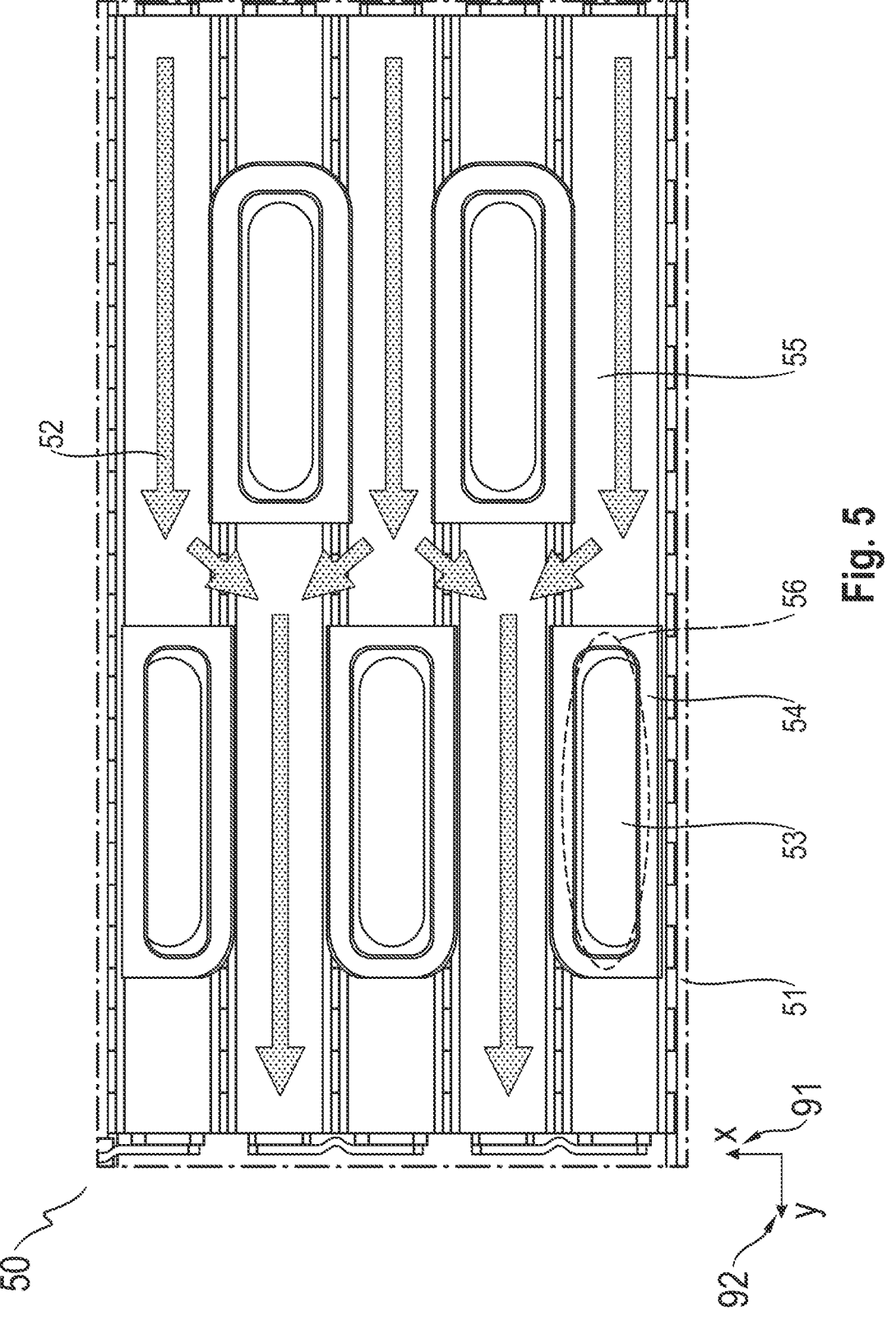
FIG. 5 schematically shows a sectional view of a flow region for a temperature control fluid of yet another further configuration of a battery module according to aspects of the invention.

FIG. 5 schematically shows a sectional view 50 of a flow region for a temperature control fluid of yet another further configuration of the battery module according to aspects of the invention. This view is desirable if the degassing side of the battery module according to aspects of the invention were to be removed from the module housing. What remains is the residual housing wall 51 and a clear view of the seals 54 and the cell degassing openings 53, as well as degassing regions 56. Indicated by means of flow direction arrows 52, 55, the temperature control fluid flows around the battery cells on their side equipped with cell degassing openings 53.

LIST OF REFERENCE NUMBERS

10 Battery system with battery modules
11 Battery module
12 Bottom of battery system
13 Mounting frame, open downwards
14 Path with temperature control fluid and busbars
20 Battery module with degassing openings
21 Module housing
22 Module degassing opening
30 Sectional view of battery module
31 Degassing side
32 Module degassing opening
33 Cell degassing opening
34 Battery cell
35 Flow space for temperature control fluid
36 Degassing region
40 Sectional view of degassing region
41 Degassing side
42 Bursting element in module degassing opening
43 Closing cap cell degassing opening
44 Seal
45 Clearance for temperature control fluid
46 Degassing region
50 Sectional view of degassing region
51 Housing wall
52 Coolant flow direction
53 Cell degassing opening
54 Seal
55 Perfused by temperature control fluid
56 Degassing region
91 x direction
92 y direction
93 z direction
94 negative z direction

What is claimed is:
1. A battery module comprising:
a plurality of battery cells,
a cuboidal module housing, and
at least one module degassing opening disposed on a degassing side of the module housing, wherein the battery module is connected to a temperature control system and the plurality of battery cells is directly surrounded by a flow of a temperature control fluid, wherein each battery cell comprises a cell degassing opening, and wherein all of the cell degassing openings are arranged to point to the degassing side, wherein the at least one module degassing opening and the respective cell degassing openings are directly connected to at least one degassing region, wherein the at least one degassing region is delimited from the temperature control fluid, and wherein the at least one degassing region has a smaller surface area extension than the degassing side such that the temperature control fluid passes between the degassing side and the battery cells, wherein the at least one degassing region is delimited from the temperature control fluid by at least one seal, wherein the seal extends around at least one of the cell degassing openings that is respectively closed with a closing part or a bursting element and, on the degassing side, around at least one module degassing opening, wherein a first member is positioned between a first battery cell and a second battery cell of the plurality of battery cells, wherein an end of the first member facing the degassing side bears on the at least one seal.

2. The battery module according to claim 1, wherein a number of respective module degassing openings is equal to a number of cell degassing openings of the plurality of battery cells arranged in the battery module and is also equal to a number of degassing regions, and wherein the respective module degassing opening and the respective cell degassing openings are arranged so as to be flush opposite one another.

3. The battery module according to claim 2, wherein a respective cell degassing opening is positively connected to the respective module degassing opening and/or to the seal enclosing the respective cell degassing opening.

4. The battery module according to claim 1, wherein the degassing side, which has the at least one module degassing opening, constitutes an underside of the battery module.

5. The battery module according to claim 4, wherein the battery module is integrated into an underbody structure of a motor vehicle.

6. The battery module according to claim 1, wherein the at least one module degassing opening is closed by either a closing part or a bursting element.

7. The battery module according to claim 1, further comprising at least one busbar for interconnecting the plurality of battery cells in the module housing, wherein the busbar is arranged on a side of the battery cell that is either adjacent to or opposite a side of the battery cell having the cell degassing opening.

8. A battery system comprising at least one battery module according to claim 1 and a temperature control system, wherein the temperature control system is configured to provide a perfusion of the at least one battery module with a dielectric temperature control fluid.

9. A motor vehicle comprising the battery module of claim 1.

10. The battery module according to claim 1, wherein a second member is positioned between the first battery cell and a third battery cell of the plurality of battery cells, wherein an end of the second member facing the degassing side bears on the at least one seal.

11. The battery module according to claim 1, wherein the at least one seal has a first end positioned against the first and second battery cells and a second pointed end that is positioned against a wall of the module housing.

12. The battery module according to claim 1, wherein each seal extends along first and second axes, and wherein the battery module further comprises a plurality of seals, wherein the seals are arranged in two columns and the seals in each column are arranged in a straight line along the first axis.

13. The battery module according to claim 12 wherein, as viewed along the second axis, the seals of a first column of the two columns are offset from the seals in a second column of the two columns.

14. The battery module according to claim 1, wherein a perimeter of the at least one seal is D-shaped.

15. The battery module according to claim 1, wherein the at least one seal delimits an area extending between the module degassing opening and a plurality of the cell degassing openings.

16. The battery module according to claim 1, wherein, at the degassing side, the at least one seal prevents one or more of the battery cells from contacting the module housing.

17. The battery module according to claim 1, further comprising a module bursting element disposed at the module degassing opening, wherein the module bursting element is positioned to face the closing part of one of the battery cells.

18. The battery module according to claim 17, wherein, as viewed in a vertical direction, the at least one seal is positioned between the module bursting element and the closing part.

\* \* \* \* \*